United States Patent
Li et al.

(10) Patent No.: US 9,155,211 B2
(45) Date of Patent: Oct. 6, 2015

(54) FIXING MECHANISM FOR FIXING A SLIDABLE DISPLAY MODULE RELATIVE TO A HOST MODULE AND PORTABLE ELECTRONIC DEVICE THEREWITH

(71) Applicant: Wistron Corporation, New Taipei (TW)

(72) Inventors: Bo-Yi Li, New Taipei (TW); Chia-Lian Yen, New Taipei (TW); Fang-Ta Chang, New Taipei (TW); Tsai-Yun Sun, New Taipei (TW); Lee-Hua Yu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 319 days.

(21) Appl. No.: 13/850,305

(22) Filed: Mar. 26, 2013

(65) Prior Publication Data

US 2013/0294022 A1    Nov. 7, 2013

(30) Foreign Application Priority Data

May 4, 2012    (TW) .............................. 101116035 A

(51) Int. Cl.
*H05K 5/00* (2006.01)
*G06F 1/16* (2006.01)

(52) U.S. Cl.
CPC ............ *H05K 5/0017* (2013.01); *G06F 1/1681* (2013.01)

(58) Field of Classification Search
CPC ................................ H05K 5/0017; G06F 1/16
USPC ............. 361/679.01–679.45, 679.55–679.61, 361/724–747, 752–759, 796–837; 248/455, 248/309.1, 316.8, 917, 922, 923, 346.4; 312/223.2, 7.1, 319.9, 333, 348.3, 222, 312/226; 455/575.1–575.5, 347, 550.1, 455/90.3
See application file for complete search history.

(56) References Cited

U.S. PATENT DOCUMENTS

| | | | | |
|---|---|---|---|---|
| 4,960,256 A * | 10/1990 | Chihara et al. | ............. | 248/286.1 |
| 5,085,394 A * | 2/1992 | Torii | .............................. | 248/455 |
| 5,168,426 A * | 12/1992 | Hoving et al. | ........... | 361/679.09 |
| 5,209,448 A * | 5/1993 | Hatanaka et al. | ............. | 248/455 |
| 5,345,362 A * | 9/1994 | Winkler | ................... | 361/679.06 |
| 6,762,928 B2 * | 7/2004 | Lo | ............................ | 361/679.58 |
| 6,840,791 B2 * | 1/2005 | Hsiu | .............................. | 439/374 |
| 7,184,263 B1 * | 2/2007 | Maskatia | ................. | 361/679.27 |
| 7,280,348 B2 * | 10/2007 | Ghosh | ....................... | 361/679.27 |
| 7,503,538 B2 * | 3/2009 | Liou et al. | ..................... | 248/447 |
| 7,611,113 B2 * | 11/2009 | Lai | .............................. | 248/286.1 |
| 8,315,044 B2 * | 11/2012 | Wu et al. | .................. | 361/679.02 |
| 8,654,520 B2 * | 2/2014 | Lin et al. | .................. | 361/679.27 |
| 8,780,544 B2 * | 7/2014 | Liang et al. | ............. | 361/679.26 |

(Continued)

*Primary Examiner* — Courtney Smith
*Assistant Examiner* — Rashen E Morrison
(74) *Attorney, Agent, or Firm* — Winston Hsu; Scott Margo

(57) ABSTRACT

A fixing mechanism for fixing a slidable display module relative to a host module is disclosed. The fixing mechanism includes a track portion, a sliding portion, at least one positioning structure and at least one engaging structure. The track portion is disposed on the host module. The sliding portion is connected to the display module and slidably installed inside the track portion, so that the display module is slidably installed on the host module. The at least one positioning structure is disposed on the track portion. The at least one engaging structure is disposed on the sliding portion. The at least one engaging structure engages with the at least one positioning structure when the sliding portion slides to an engaging position relative to the track portion, so as to fix the display module on the host module.

20 Claims, 17 Drawing Sheets

(56) References Cited

U.S. PATENT DOCUMENTS

| | | | |
|---|---|---|---|
| 8,902,585 B2* | 12/2014 | Tseng et al. | 361/679.55 |
| 2008/0024975 A1* | 1/2008 | Huang et al. | 361/686 |
| 2010/0309612 A1* | 12/2010 | Liang et al. | 361/679.01 |
| 2012/0268882 A1 | 10/2012 | McClure | |
| 2013/0077212 A1* | 3/2013 | Nakajima | 361/679.01 |
| 2013/0128442 A1* | 5/2013 | Tseng et al. | 361/679.09 |
| 2013/0128443 A1* | 5/2013 | Tseng et al. | 361/679.12 |
| 2013/0329351 A1* | 12/2013 | Lin | 361/679.27 |

* cited by examiner

FIXING MECHANISM FOR FIXING A SLIDABLE DISPLAY MODULE RELATIVE TO A HOST MODULE AND PORTABLE ELECTRONIC DEVICE THEREWITH

BACKGROUND

1. Field of the Described Embodiments

The present disclosure relates to a fixing mechanism and a portable electronic device therewith, and more particularly, to a fixing mechanism for fixing a slidable display module relative to a host module and a portable electronic device therewith.

2. Description of the Prior Art

A conventional tablet computer utilizes a touch panel to perform touch control instruction. Since operation of the touch panel does not meet user's needs, a portable computer device combining a notebook computer host with keyboard and the touch panel arises for solving above drawbacks. Conventionally, a host module cooperatively with a hinge mechanism pivoted to the host module are utilized for supporting the touch panel, and a track is utilized for sliding the touch panel relative to the host module. However, it often occurs that the touch panel incapable of smoothly sliding relative to the host module. For example, over contact between the sliding structure and a side wall of the track causes increase of friction, resulting in jammed situation. As a result, it reduces convenience in operation.

SUMMARY OF DESCRIBED EMBODIMENTS

The present disclosure provides a fixing mechanism for fixing a slidable display module relative to a host module and a portable electronic device therewith for solving above drawbacks.

According to the claimed disclosure, a fixing mechanism for fixing a slidable display module relative to a host module includes a track portion, a sliding portion, at least one positioning structure and at least one engaging structure. The track portion is disposed on the host module. The sliding portion is connected to the display module and slidably installed inside the track portion, so that the display module is slidably installed on the host module. The at least one positioning structure is disposed on the track portion. The at least one engaging structure is disposed on the sliding portion. The at least one engaging structure engages with the at least one positioning structure when the sliding portion slides to an engaging position relative to the track portion, so as to fix the display module on the host module.

According to the claimed disclosure, the at least one positioning structure is a recess structure disposed on a lateral side of the track portion, and the at least one engaging structure includes a spherical member and a resilient member. The spherical member is for engaging with the recess structure. The resilient member abuts against the spherical member for providing the spherical member with a resilient force, so as to drive the spherical member to engage with the recess structure when the sliding portion slides to the engaging position relative to the track portion.

According to the claimed disclosure, the at least one engaging structure further includes a sleeve embedded in the sliding portion, and the spherical member and the resilient member are disposed inside the sleeve in a movable manner.

According to the claimed disclosure, a bore diameter of an opening on an end of the sleeve is substantially equal to or smaller than a diameter of the spherical member.

According to the claimed disclosure, the at least one engaging structure is a recess structure disposed on a lateral side of the sliding portion, and the at least one positioning structure includes a spherical member and a resilient member. The spherical member is for engaging with the recess structure. The resilient member abuts against the spherical member for providing the spherical member with a resilient force, so as to drive the spherical member to engage with the recess structure when the sliding portion slides to the engaging position relative to the track portion.

According to the claimed disclosure, the at least one positioning structure further includes a sleeve embedded in the track portion, and the spherical member and the resilient member are disposed inside the sleeve in a movable manner.

According to the claimed disclosure, the at least one positioning structure is a resilient wave-shaped structure, and the at least one engaging structure is a sliding rod structure for engaging with the resilient wave-shaped structure when the sliding portion slides to the engaging position relative to the track portion.

According to the claimed disclosure, the sliding rod structure is engaged between the resilient wave-shaped structure and a side wall of the track portion when the sliding portion slides to the engaging position relative to the track portion.

According to the claimed disclosure, the resilient wave-shaped structure is disposed on a bottom side or a lateral side of the track portion.

According to the claimed disclosure, a portable electronic device includes a host module, a display module and a fixing mechanism. The display module is disposed on a side of the host module and slidable relative to the host module. The fixing mechanism is connected to the host module and the display module for fixing the display module on the host module and includes a track portion, a sliding portion, at least one positioning structure and at least one engaging structure. The track portion is disposed on the host module. The sliding portion is connected to the display module and slidably installed inside the track portion, so that the display module is slidably installed on the host module. The at least one positioning structure is disposed on the track portion. The at least one engaging structure is disposed on the sliding portion. The at least one engaging structure engages with the at least one positioning structure when the sliding portion slides to an engaging position relative to the track portion, so as to fix the display module on the host module.

In summary, the present disclosure utilizes the positioning structure of the track portion and the engaging structure of the sliding portion to fix the display module on the host module. Since the positioning structure and the engaging structure do not always contact during the whole sliding movement of the sliding portion and the track portion, the positioning structure engages with the engaging structure when the sliding portion slides relative to the track portion to the engaging position instead. Accordingly, it can reduce friction due to over contact between the sliding portion and a side wall of the track portion, so as to solve jammed situation and issue of the display module incapable of sliding smoothly relative to the host module. As a result, it can enhance convenience in operation. Furthermore, the fixing mechanism of the present disclosure can support the display module itself and the display module in use, so as to stably fix the display module on the host module and to stabilize performance of operation.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the disclosure may be practiced. In this regard, directional terminology, such as "top," "bottom," etc., is used with reference to the orientation of the Figure (s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
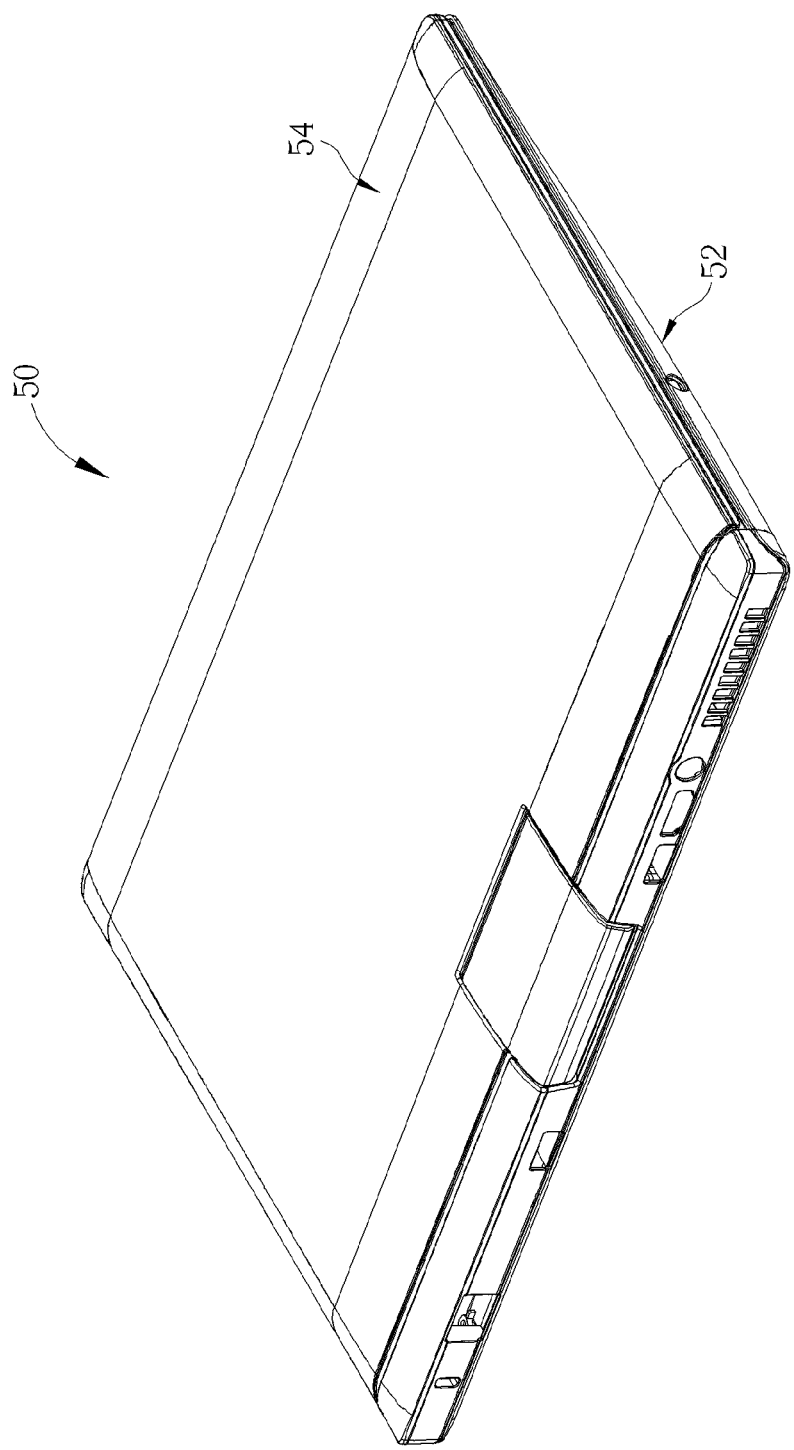
FIG. 1 to FIG. 3 are respectively schematic diagrams of a portable electronic device in different statuses and angles according to an embodiment of the present disclosure.
Figure 2:
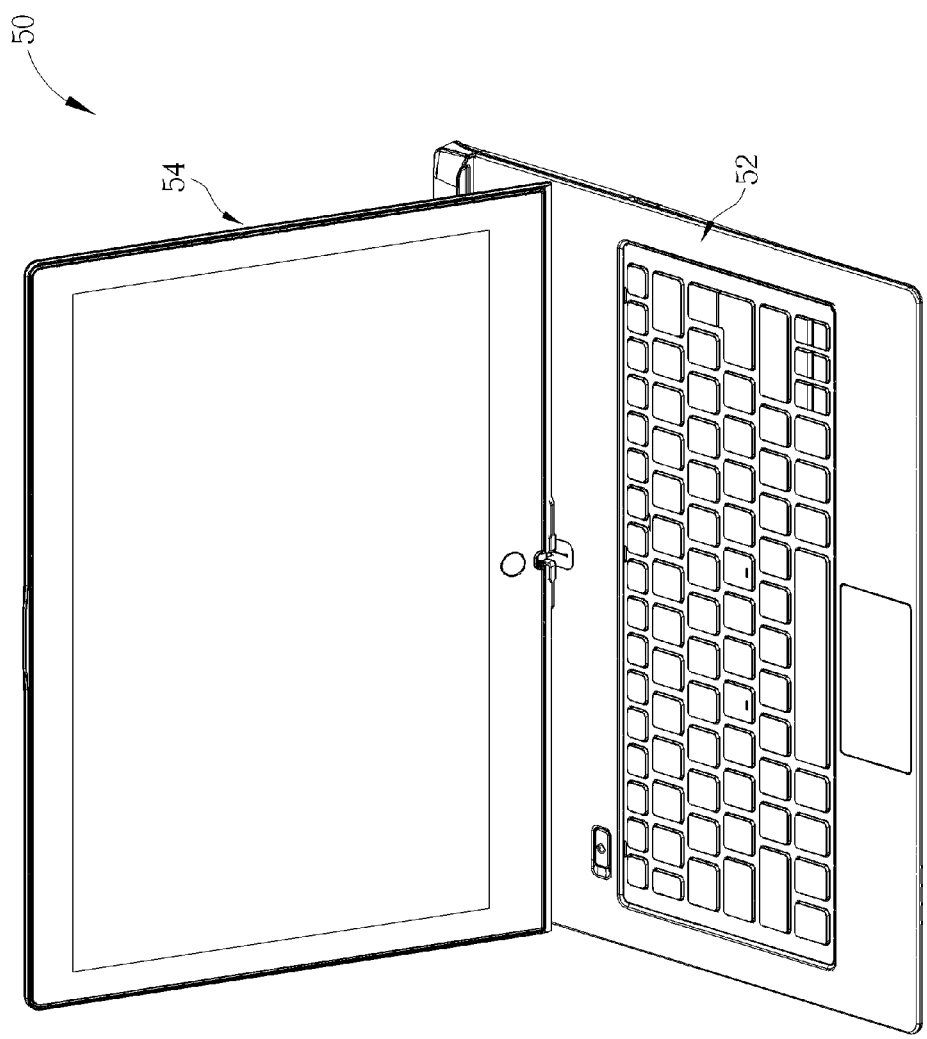
Figure 3:
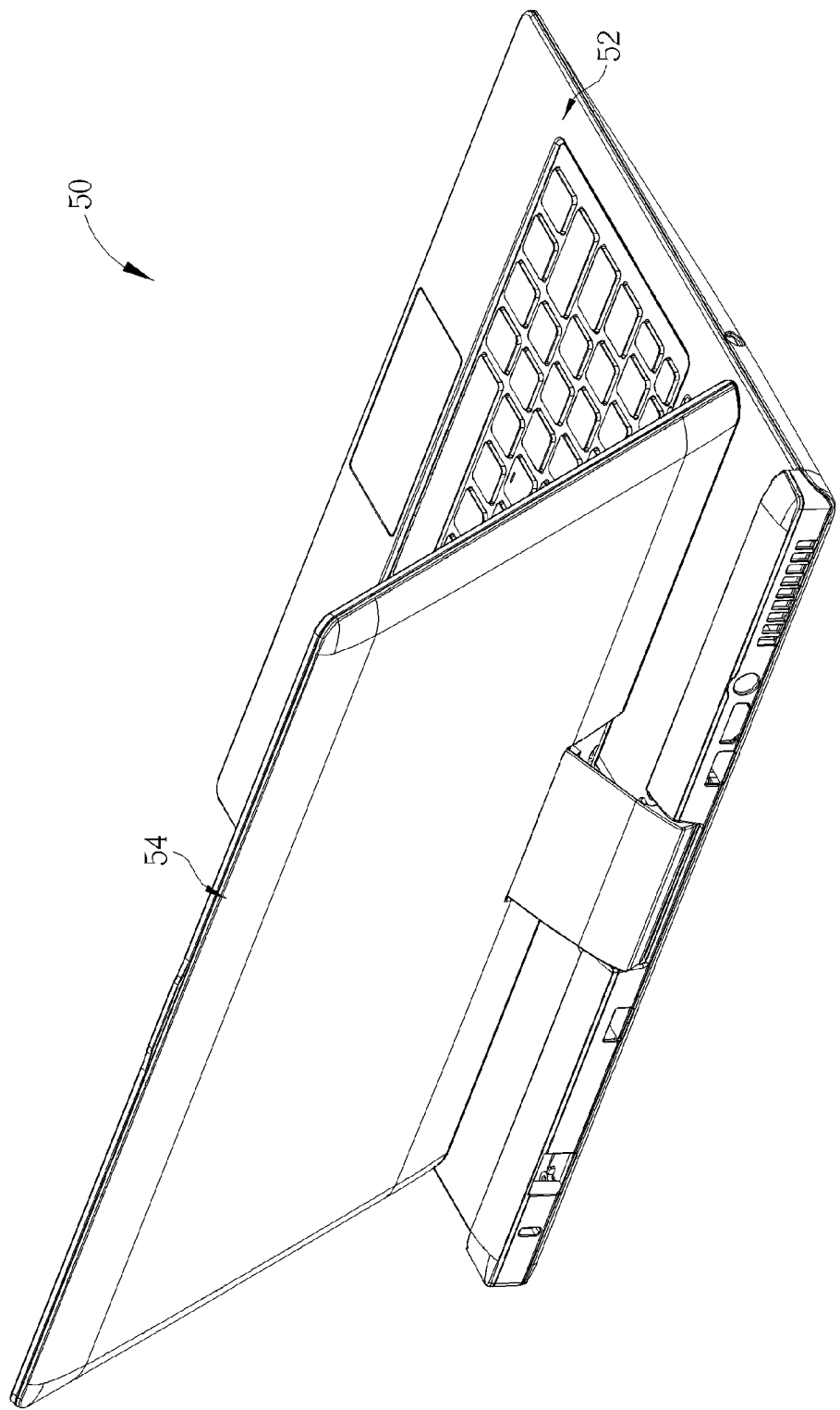

Please refer FIG. 1 to FIG. 3. FIG. 1 to FIG. 3 are respectively schematic diagrams of a portable electronic device 50 in different statuses and angles according to an embodiment of the present disclosure. The portable electronic device 50 can be a portable computer device with dual modes of notebook computer and tablet computer. The portable electronic device 50 includes a host module 52, which can be a computer host module equipped with input interfaces such as a keyboard and so on. The portable electronic device 50 further includes a display module 54 disposed on a side of the host module 52 in a manner that the display module 54 is slidable relative to the host module 52. In this embodiment, the display module 54 can be a touch panel, i.e. a touch control operation can be performed on the display module 54. As shown in FIG. 1, the host module 52 and the display module 54 are in a contained status. As shown in FIG. 2 and FIG. 3, the display module 54 and the host module 52 are in an expanded status, and thus the touch control operation can be performed on the display module 54 in the meanwhile for operating the portable electronic device 50.

Figure 4:
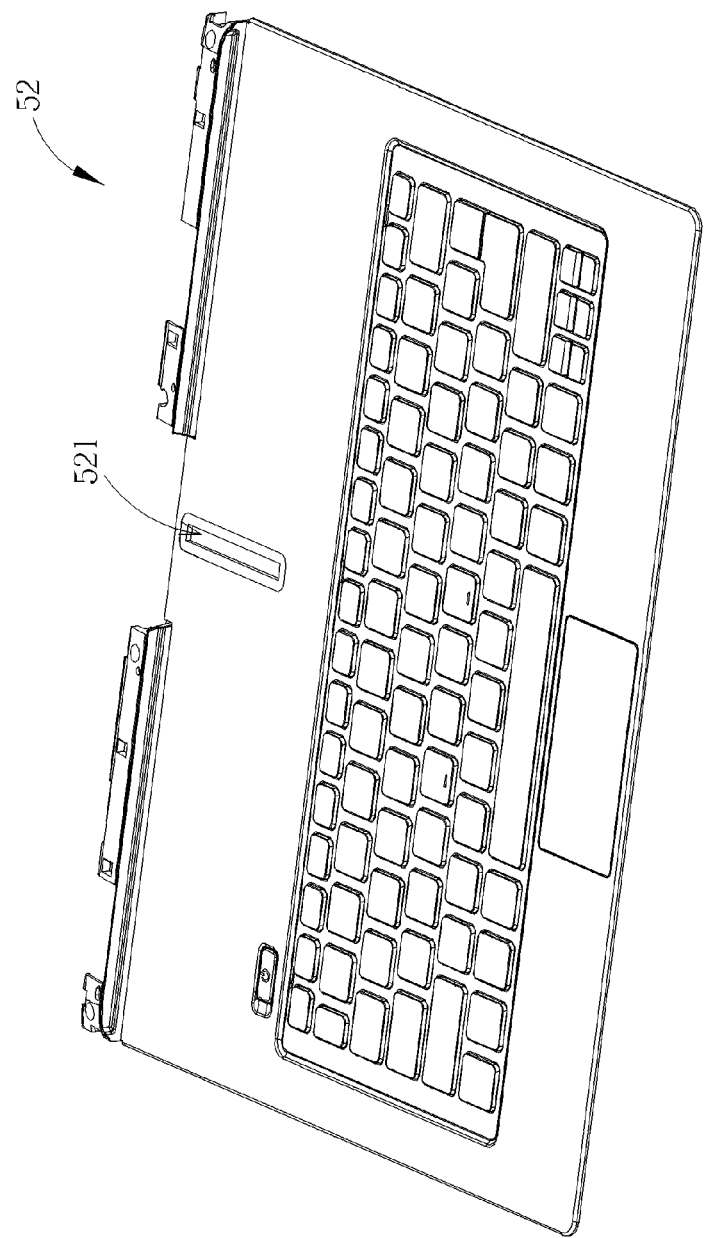
FIG. 4 is a partly structural diagram of a host module according to the embodiment of the present disclosure.
Figure 5:
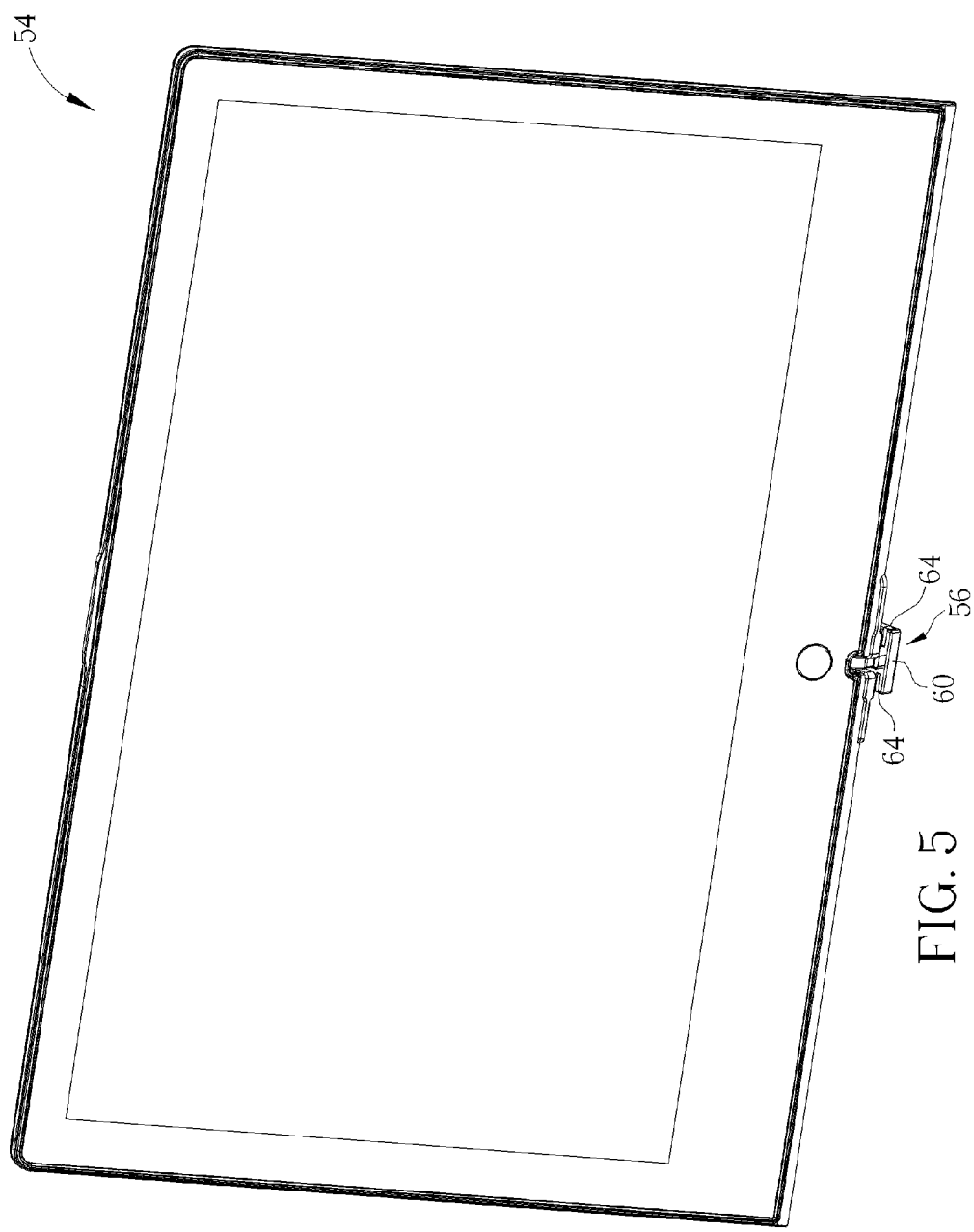
FIG. 5 and FIG. 6 are respectively partly diagrams of a fixing mechanism according to a first embodiment of the present disclosure.
Figure 6:
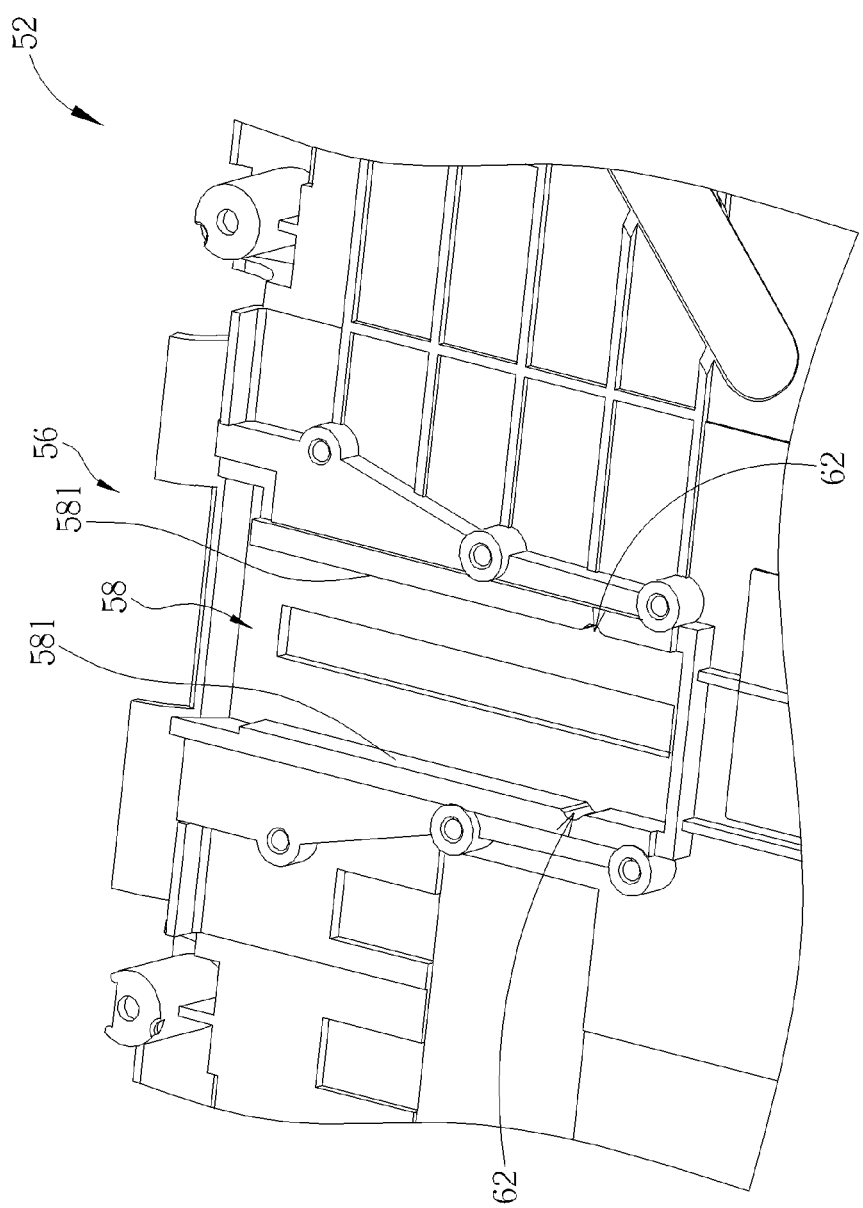

Please refer FIG. 4 to FIG. 6. FIG. 4 is a partly structural diagram of the host module 52 according to the embodiment of the present disclosure. FIG. 5 and FIG. 6 are respectively partly diagrams of a fixing mechanism 56 according to a first embodiment of the present disclosure. In order to slide the display module 54 relative to the host module 52 and to fix the display module 54 on the host module 52, the portable electronic device 50 further includes a fixing mechanism 56 connected to the host module 52 and the display module 54. The fixing mechanism 56 is used for fixing the display module 54 on the host module 52. The fixing mechanism 56 includes a track portion 58, a sliding portion 60, at least one positioning structure 62 and at least one engaging structure 64. The track portion 58 is disposed on the host module 52. The sliding portion 60 is connected to the display module 54 and slidably installed inside the track portion 58, so that the display module 54 is slidably installed on the host module 52. Furthermore, a slot 521 is formed on the host module 52, and the sliding portion 60 is disposed through the slot 521 and installed inside the track portion 58. In addition, the sliding portion 60 is pivoted to the display module 54, so that the display module 54 can pivot relative to the host module 52 for adjusting a view angle at which a user watches the display module 54.

Figure 7:
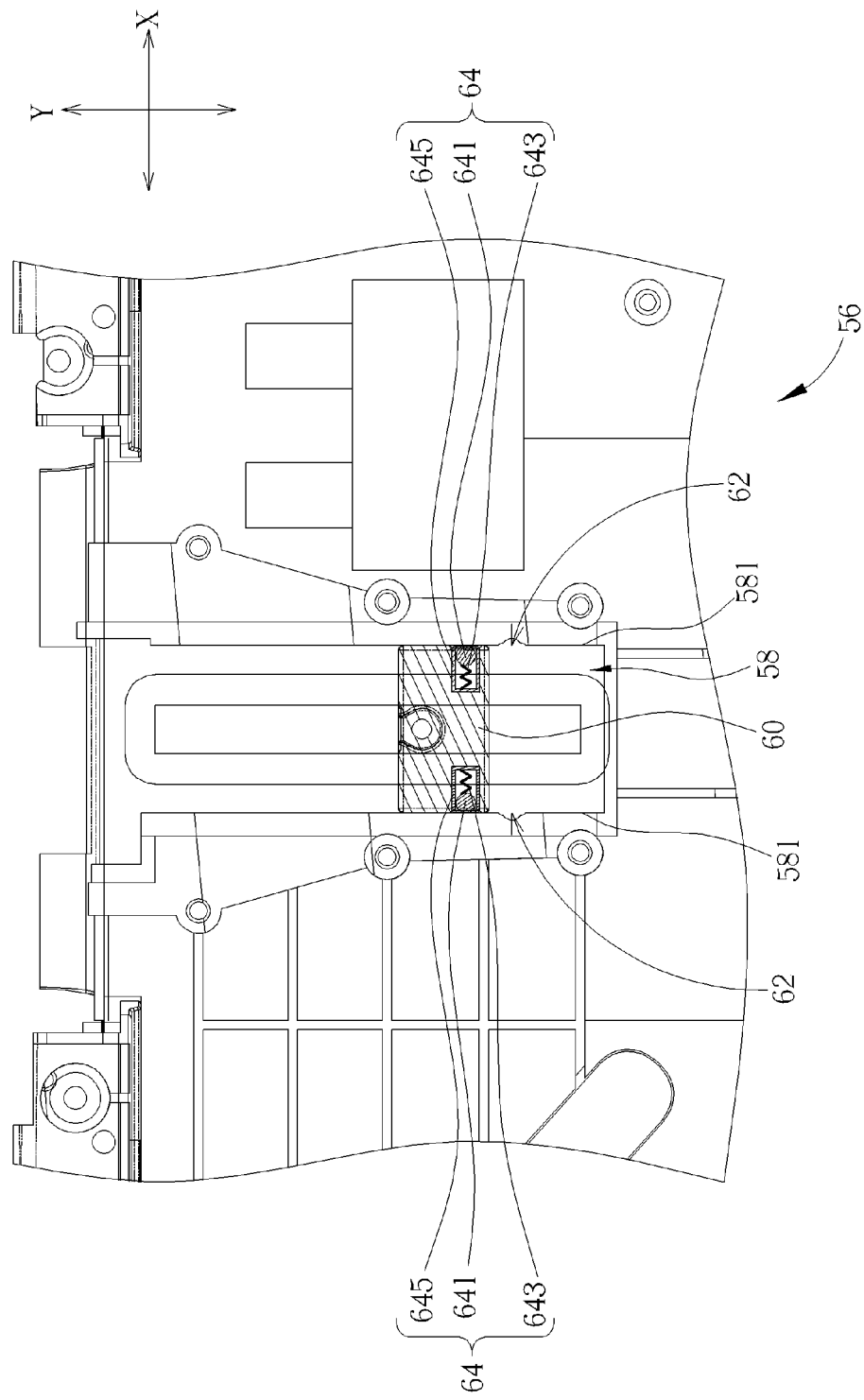
FIG. 7 and FIG. 8 are respectively sectional diagrams of positioning structures and engaging structures in different positions according to the first embodiment of the present disclosure.
Figure 8:
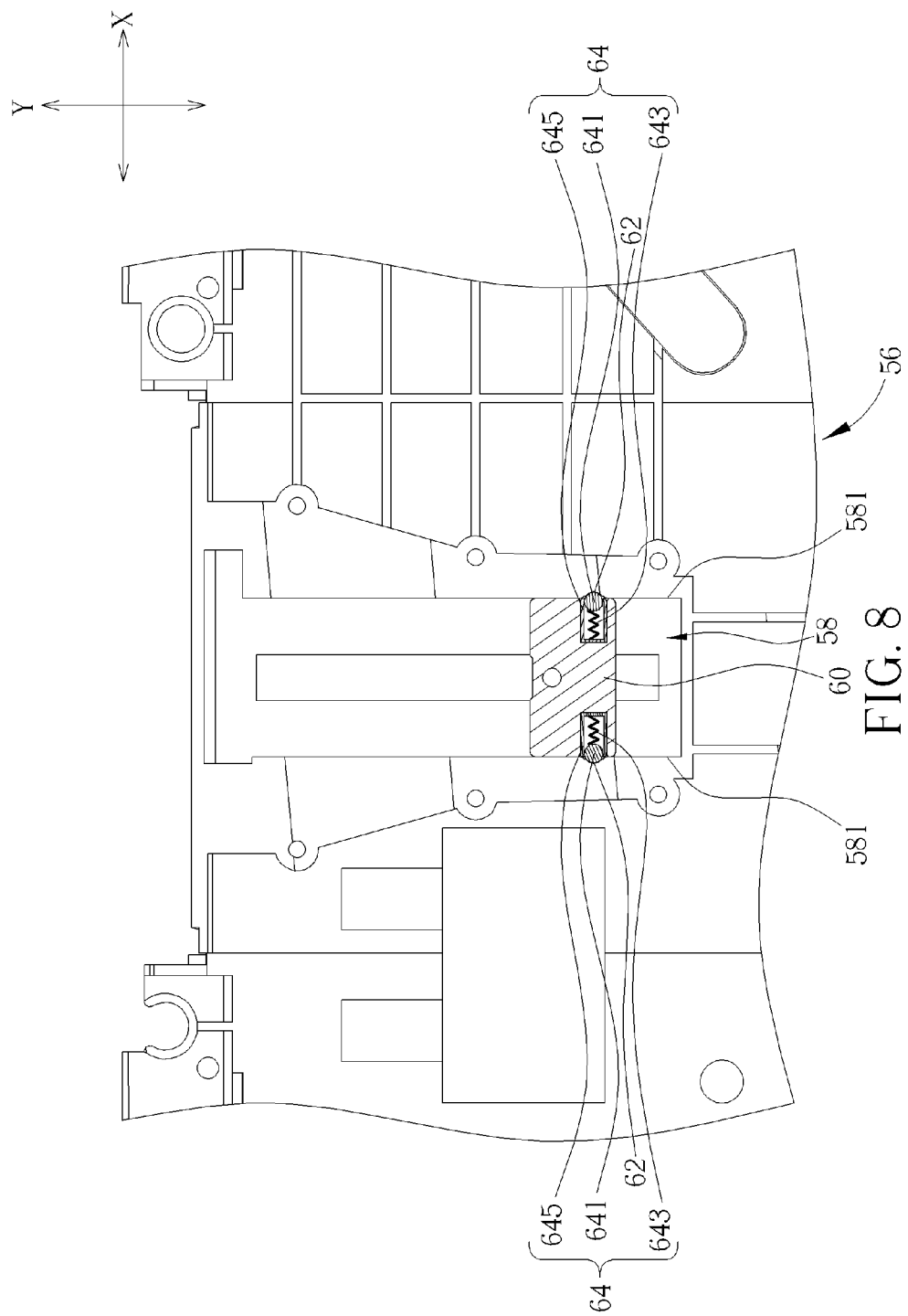
Figure 9:
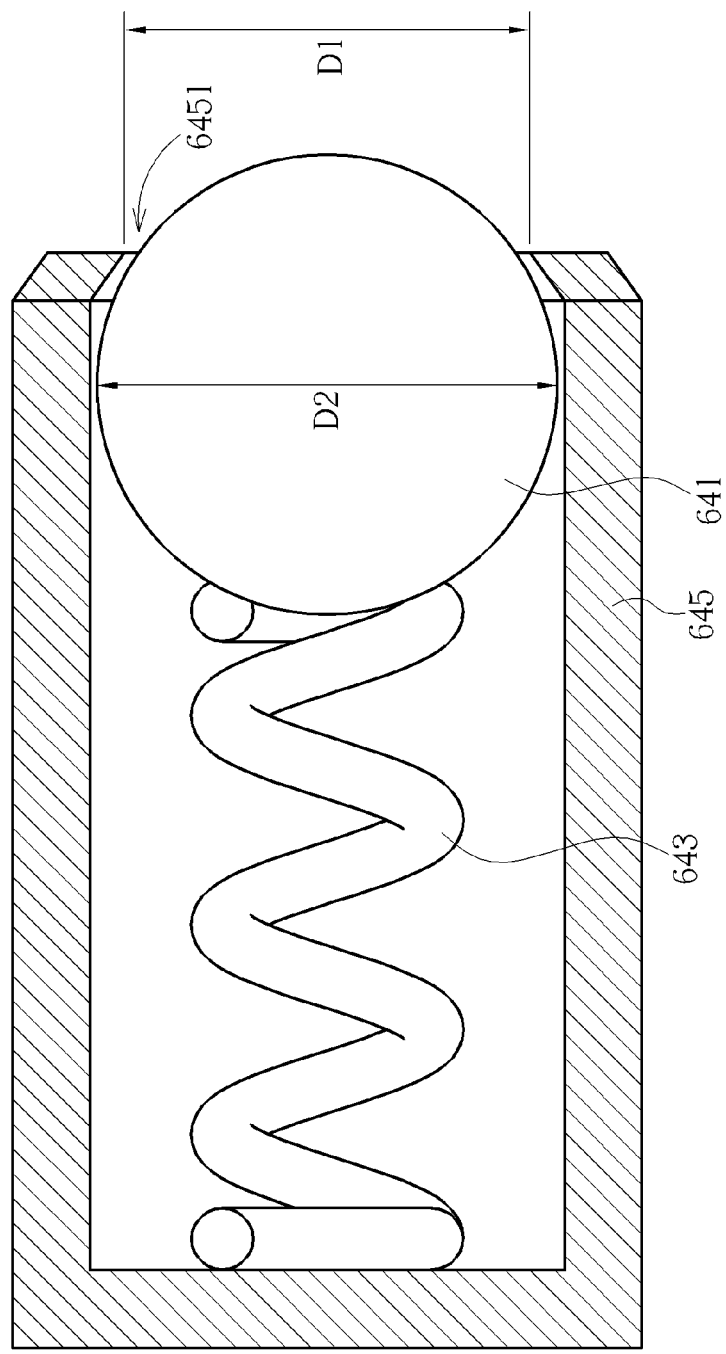
FIG. 9 is a diagram illustrating a spherical member and a resilient member disposed inside a sleeve according to the first embodiment of the present disclosure.

In this embodiment, the fixing mechanism 56 can include two positioning structures 62 and two engaging structures 64. The two positioning structures 62 can be respectively disposed on two sides of the track portion 58, and the two engaging structures 64 can be disposed on two sides of the sliding portion 60. Amounts and disposal positions of the above-mentioned components are not limited to those mentioned in this embodiment, and it depends on practical demands. Please refer to FIG. 5 to FIG. 8. FIG. 7 and FIG. 8 are respectively sectional diagrams of the positioning structures 62 and the engaging structures 64 in different positions according to the first embodiment of the present disclosure. In this embodiment, each of the positioning structure 62 is a recess structure disposed on a lateral side 581 of the track portion 58, and each of the engaging structure 64 includes a spherical member 641, a resilient member 643 and a sleeve 645. The spherical member 641 is used for engaging with the positioning structure 62, i.e. the recess structure, and the spherical member 641 can be a rigid member, such as a steel bead and so on, for rub prevention. The resilient member 643 abuts against the spherical member 641 for providing the spherical member 641 with a resilient force, so as to drive the spherical member 641 to engage with the positioning structure 62 when the sliding portion 60 slides to an engaging position shown in FIG. 8 relative to the track portion 58. In this embodiment, the resilient member 643 can be a spring, and an end of the resilient member 643 can be connected to the spherical member 641 directly, or the spherical member 641 can be connected to the end of the resilient member 643 in an engaging manner, alternatively. The sleeve 645 is embedded in the sliding portion 60, and the spherical member 641 and the resilient member 643 are disposed inside the sleeve 645 in a movable manner. Please refer to FIG. 9. FIG. 9 is a diagram illustrating the spherical member 641 and the resilient member 643 disposed inside the sleeve 645 according to the first embodiment of the present disclosure. In this embodiment, a bore diameter D1 of an opening 6451 on an end of the sleeve 645 can be substantially equal to or smaller than a diameter D2 of the spherical member 641, so that the spherical member 641 cannot separate from the sleeve 645 as being driven by the resilient member 643.

When the display module 54 pivots and slides relative to the host module 52, the sliding portion 60 slides relative to the track portion 58 in a Y direction, as shown in FIG. 7 and FIG. 8, and the two lateral sides 581 of the track portion 58 can constrain the sliding portion 60 to move in an X direction. When the sliding portion 60 slides relative to the track portion 58 to a position in FIG. 7 where the engaging structure 64 does not engage with the positioning structure 62, the lateral side 581 of the track portion 58 pushes the spherical member 641, so as to compress the resilient member 643 in the X direction. In the meanwhile, the resilient member 643 stores a resilient potential energy. When the sliding portion 60 slides relative to the track portion 58 to a position in FIG. 8 where the engaging structure 64 engages with the positioning structure 62, the resilient member 643 releases the resilient potential energy and provides the spherical member 641 with a resilient force in the X direction since the lateral side 581 of the track portion 58 does not constrain the spherical member 641, so as to drive the spherical member 641 to engage with the positioning structure 62. In the meanwhile, friction between the spherical member 641 and an inner wall of the positioning structure 62 can support the display module 54 itself and the display module 54 in use, so as to stably fix the display module 54 on the host module 52. When the display module 54 pivots to a specific angle such as 150 degrees relative to the host module 52, the sliding portion 60 slides to the engaging position relative to the track portion 58, i.e. the engaging structure 64 engages with the positioning structure 62, so as to fix the display module 54 at a best viewing angle relative to the host module 52. Furthermore, the fixing mechanism 56 of the present disclosure can utilizes plural positioning mechanisms. In other words, a plurality of positioning structures 62 can be disposed on the track portion 58, and the engaging structure 64 can selectively engage with one of the plurality of the positioning structures 62, so as to fix the display module 54 relative to the host module 52 in different positions. An amount and disposal position of the positioning structure 62 is not limited to those mentioned in this embodiment, it depends on practical demands.

Figure 10:
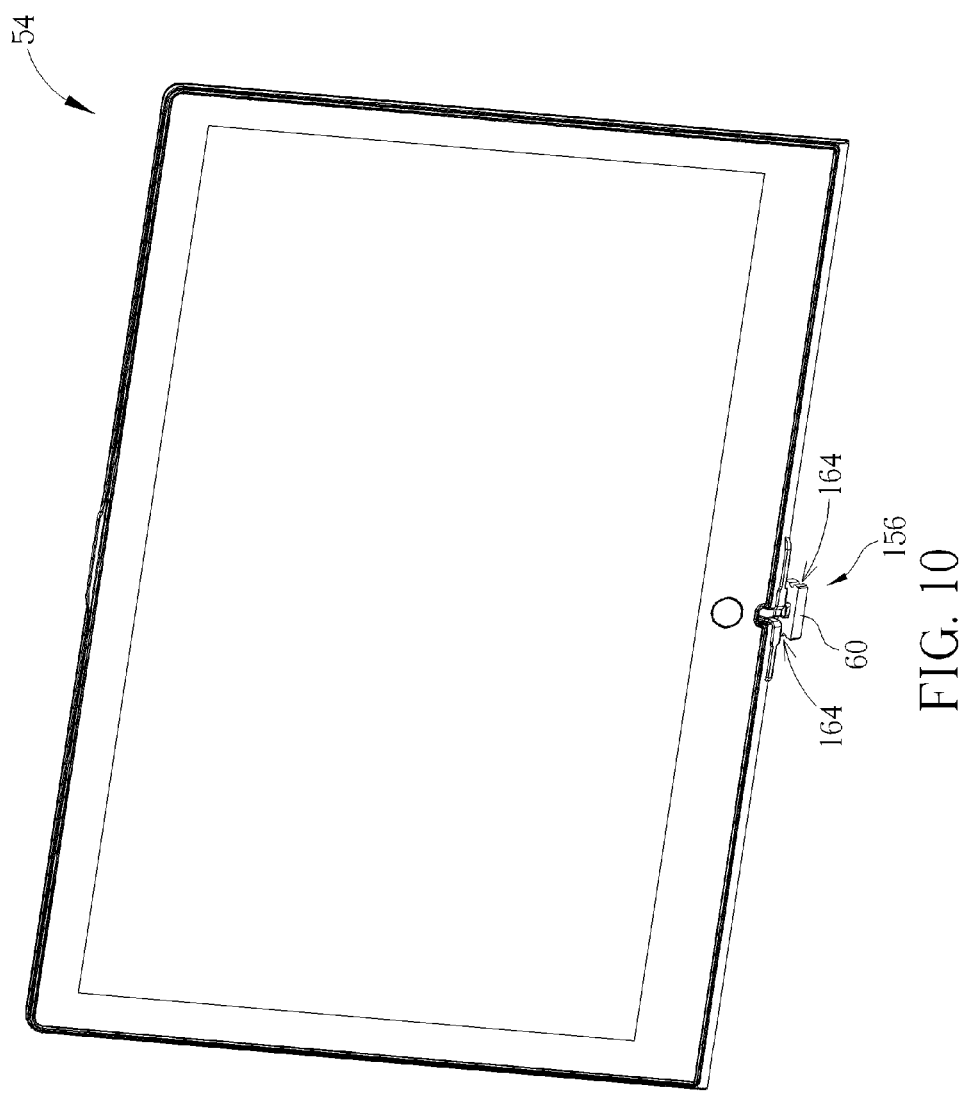
FIG. 10 and FIG. 11 are respectively partly diagrams of a fixing mechanism according to a second embodiment of the present disclosure.
Figure 11:
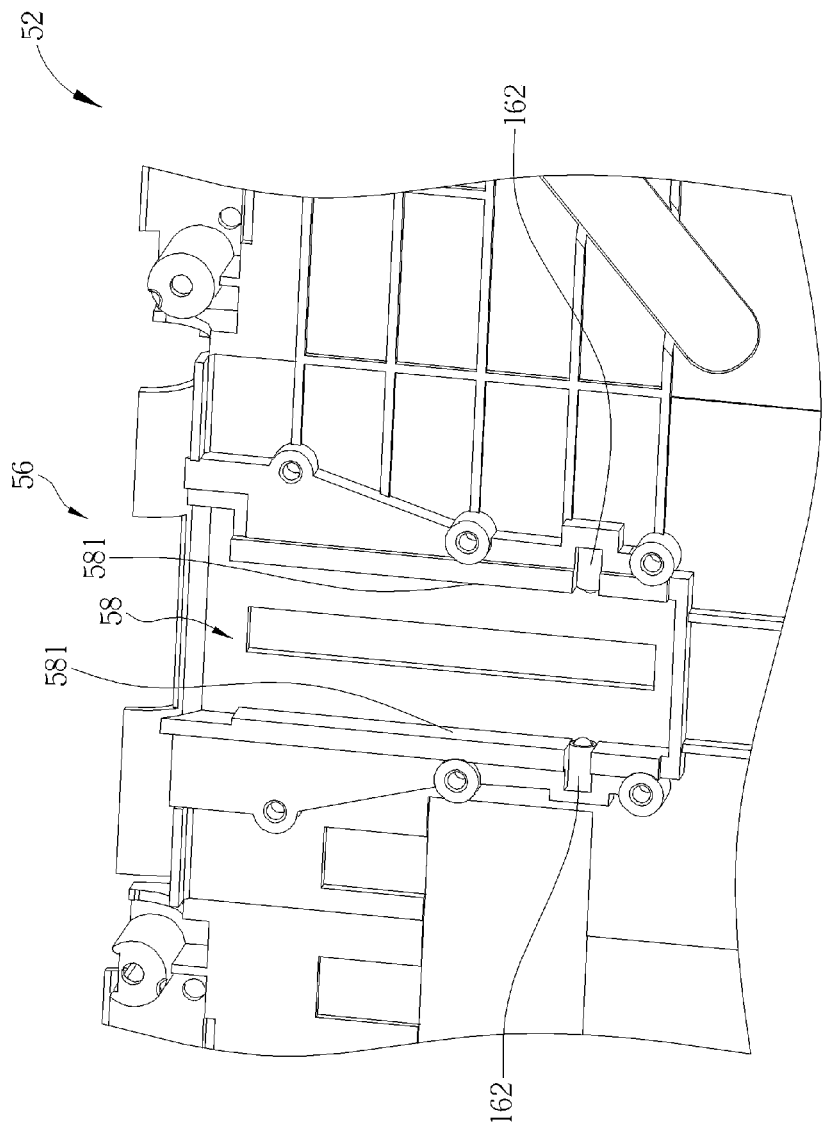
Figure 12:
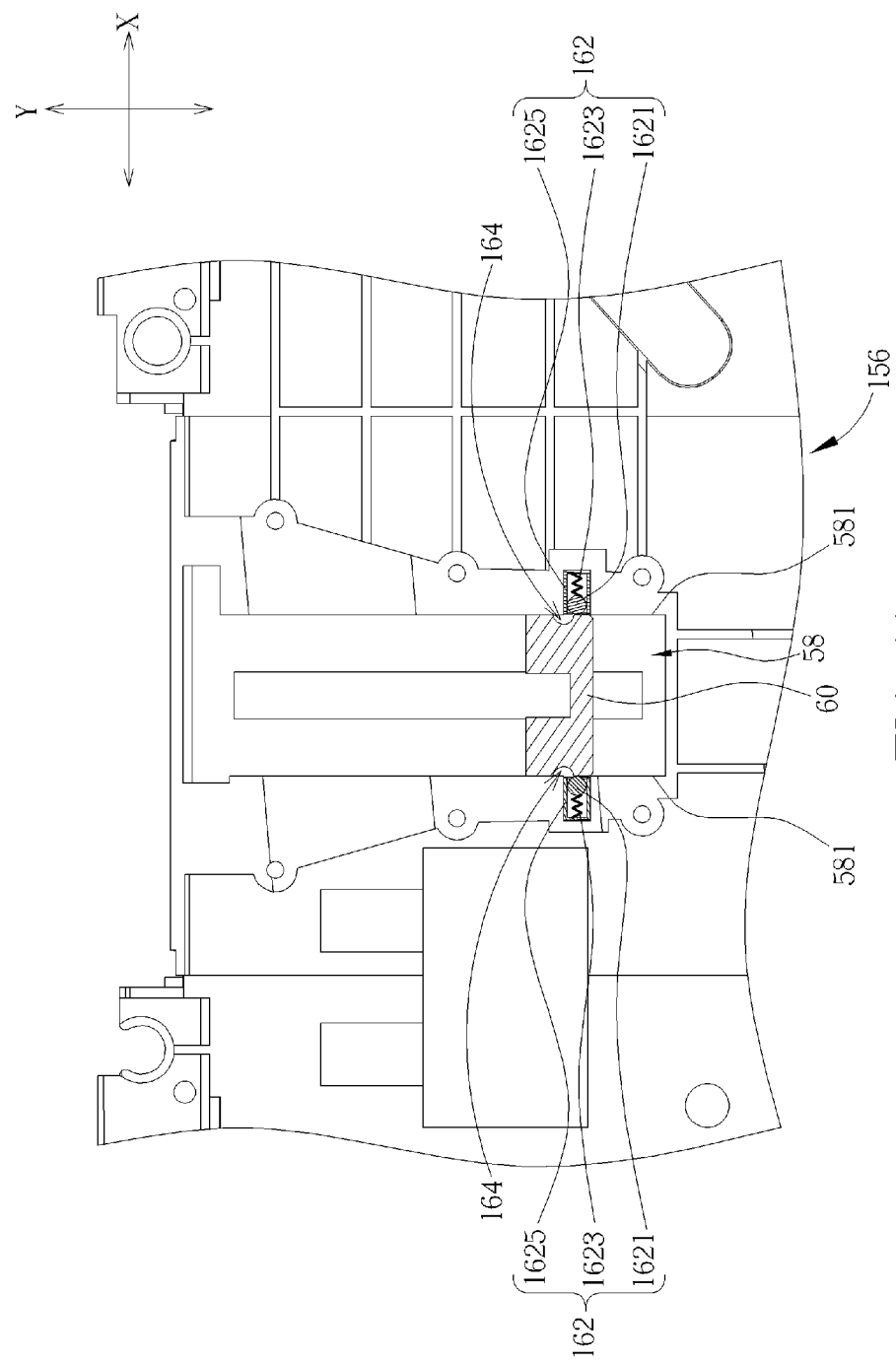
FIG. 12 and FIG. 13 are respectively sectional diagrams of at least one positioning structure and at least one engaging structure in different relative positions according to the second embodiment of the present disclosure.
Figure 13:
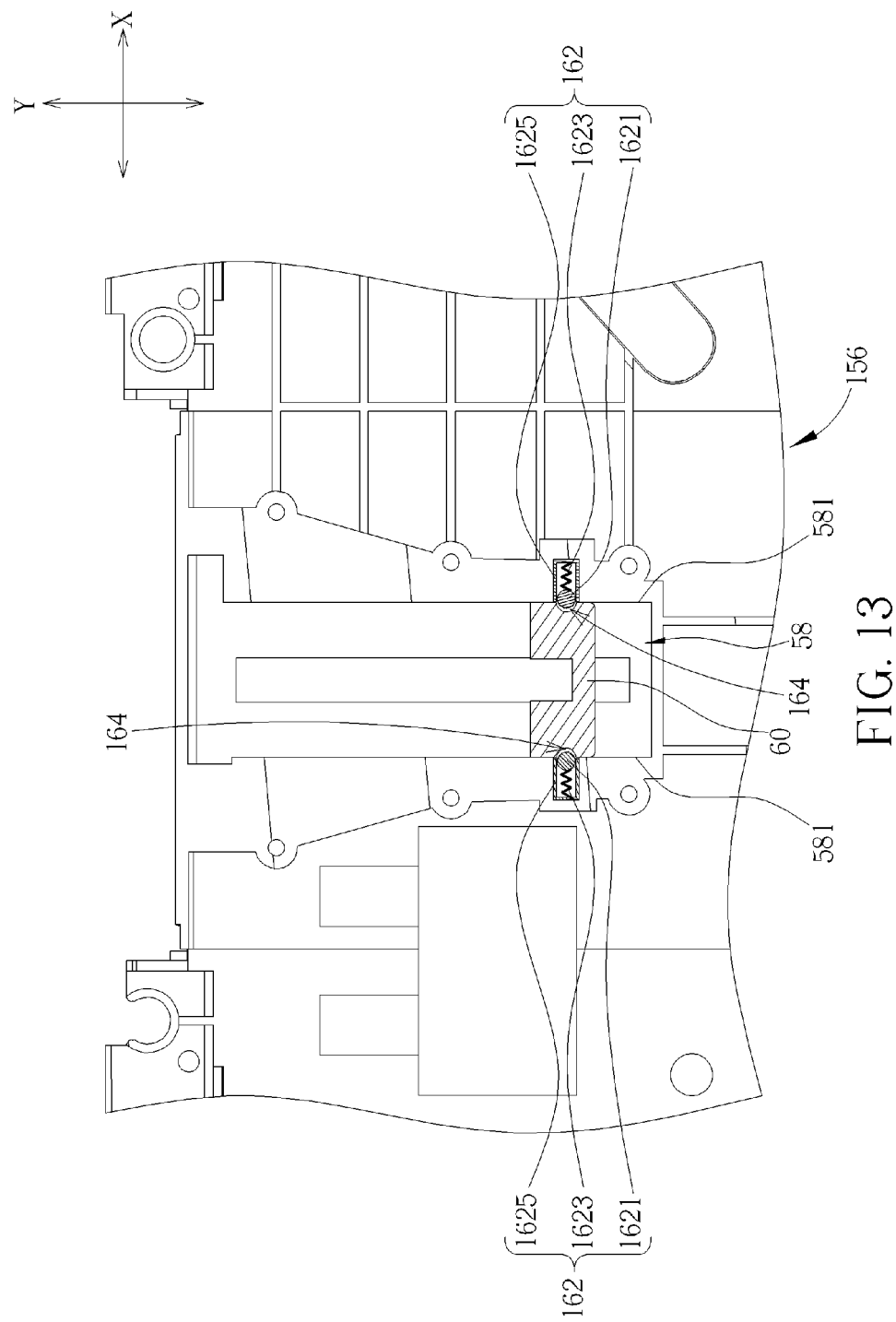

Furthermore, disposal positions of the positioning structure 62 and the engaging structure 64 in the first embodiment can be switched. Please refer to FIG. 10 to FIG. 13. FIG. 10 and FIG. 11 are respectively partly diagrams of a fixing mechanism 156 according to a second embodiment of the present disclosure. FIG. 12 and FIG. 13 are respectively sectional diagrams of at least one positioning structure 162 and at least one engaging structure 164 in different relative positions according to the second embodiment of the present disclosure. In this embodiment, the fixing mechanism 156 includes two positioning structures 162 and two engaging structures 164. The two positioning structures 162 are respectively disposed on two sides of the track portion 58, and the two engaging structures 164 are respectively disposed on two sides of the sliding portion 60. Amounts and disposal positions of the aforesaid components are not limited to those mentioned in this embodiment, and it depends on practical demands. The main difference between the second embodiment and the first embodiment is that each of the engaging structures 164 is a recess structure disposed on the lateral side of the sliding portion 60, and each of the positioning structures 162 includes a spherical member 1621, a resilient member 1623 and a sleeve 1625. The spherical member 1621 is used for engaging with the engaging structure 164, i.e. the recess structure, and the spherical member 1621 can be a rigid member, such as a steel bead and so on, for rub prevention. The resilient member 1623 abuts against the spherical member 1621 for providing the spherical member 1621 with a resilient force, so as to drive the spherical member 1621 to engage with the engaging structure 164 when the sliding portion 60 slides to an engaging position shown in FIG. 13 relative to the track portion 58. In this embodiment, the resilient member 1623 can be a spring, and an end of the resilient member 1623 can be connected to the spherical member 1621 directly, or the spherical member 1621 can be connected to the end of the resilient member 1623 in an engaging manner, alternatively. The sleeve 1625 is embedded in the track portion 58, and the spherical member 1621 and the resilient member 1623 are disposed inside the sleeve 1625 in a movable manner.

When the display module 54 pivots and slides relative to the host module 52, the sliding portion 60 slides relative to the track portion 58 in the Y direction, as shown in FIG. 12 and FIG. 13, and the two lateral sides 581 of the track portion 58 can constrain the sliding portion 60 to move in the X direction. When the sliding portion 60 slides relative to the track portion 58 to a position in FIG. 12 where the engaging structure 64 does not engage with the positioning structure 62, the lateral side of the sliding portion 60 pushes the spherical member 1621, so as to compress the resilient member 1623 in the X direction. In the meanwhile, the resilient member 1623 stores the resilient potential energy. When the sliding portion 60 slides relative to the track portion 58 to the engaging position in FIG. 13, the resilient member 1623 releases the resilient potential energy and provides the spherical member 1621 with the resilient force in the X direction since the lateral side 581 of the track portion 58 does not constrain the spherical member 1621, so as to drive the spherical member 1623 to engage with the engaging structure 164. In the meanwhile, friction between the spherical member 1621 and an inner wall of the engaging structure 164 can support the display module 54 itself and the display module 54 in use, so as to stably fix the display module 54 on the host module 52. Similarly, the fixing mechanism 156 of the present disclosure can utilizes plural positioning mechanisms. In other words, a plurality of positioning structures 162 can be disposed on the track portion 58, and the engaging structure 164 can selectively engage with one of the plurality of the positioning structures 162, so as to fix the display module 54 relative to the host module 52 in different positions. An amount and disposal position of the positioning structure 162 is not limited to those mentioned in this embodiment, it depends on practical demands.

Figure 14:
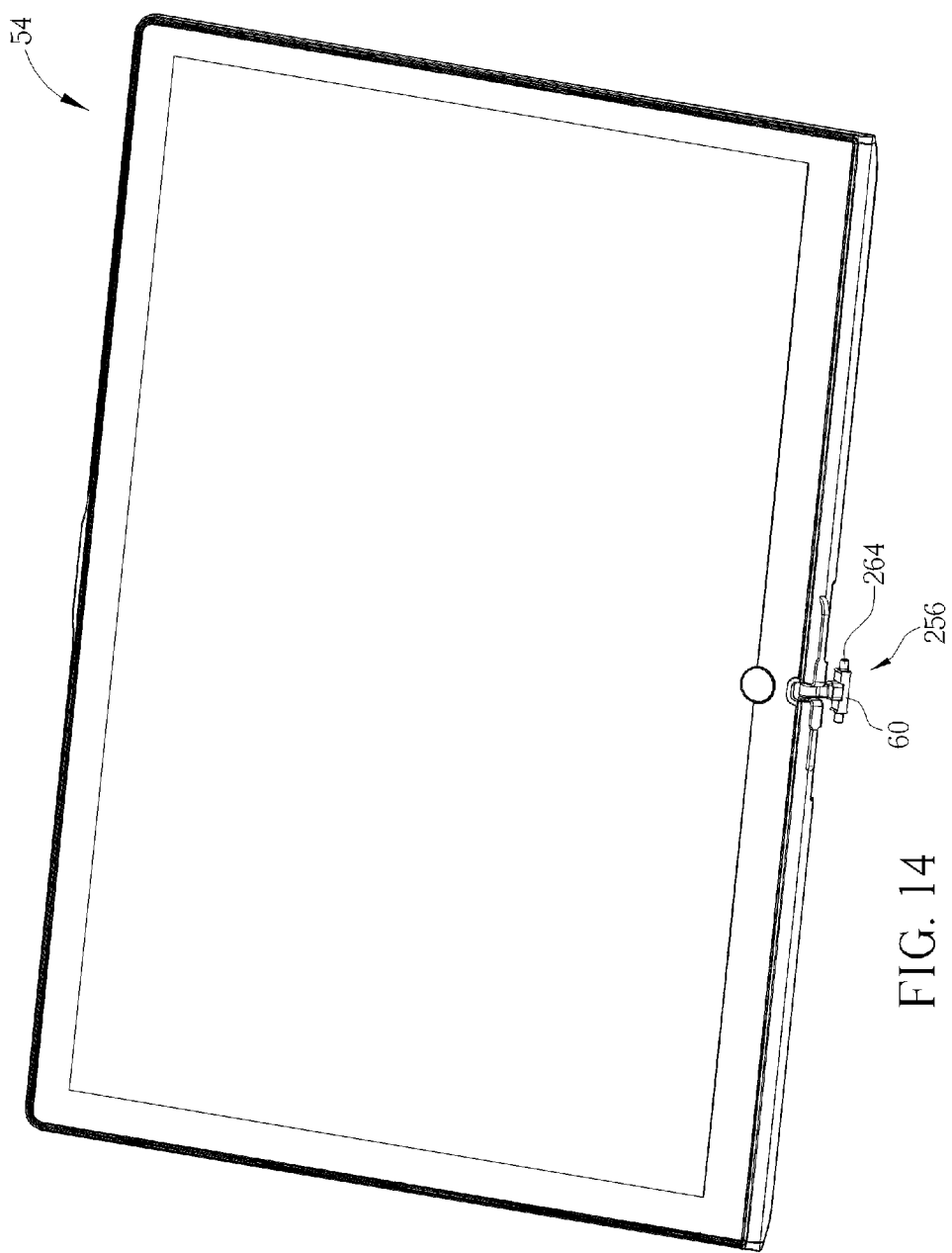
FIG. 14 and FIG. 15 are respectively partly diagrams of a fixing mechanism according to a third embodiment of the present disclosure.
Figure 15:
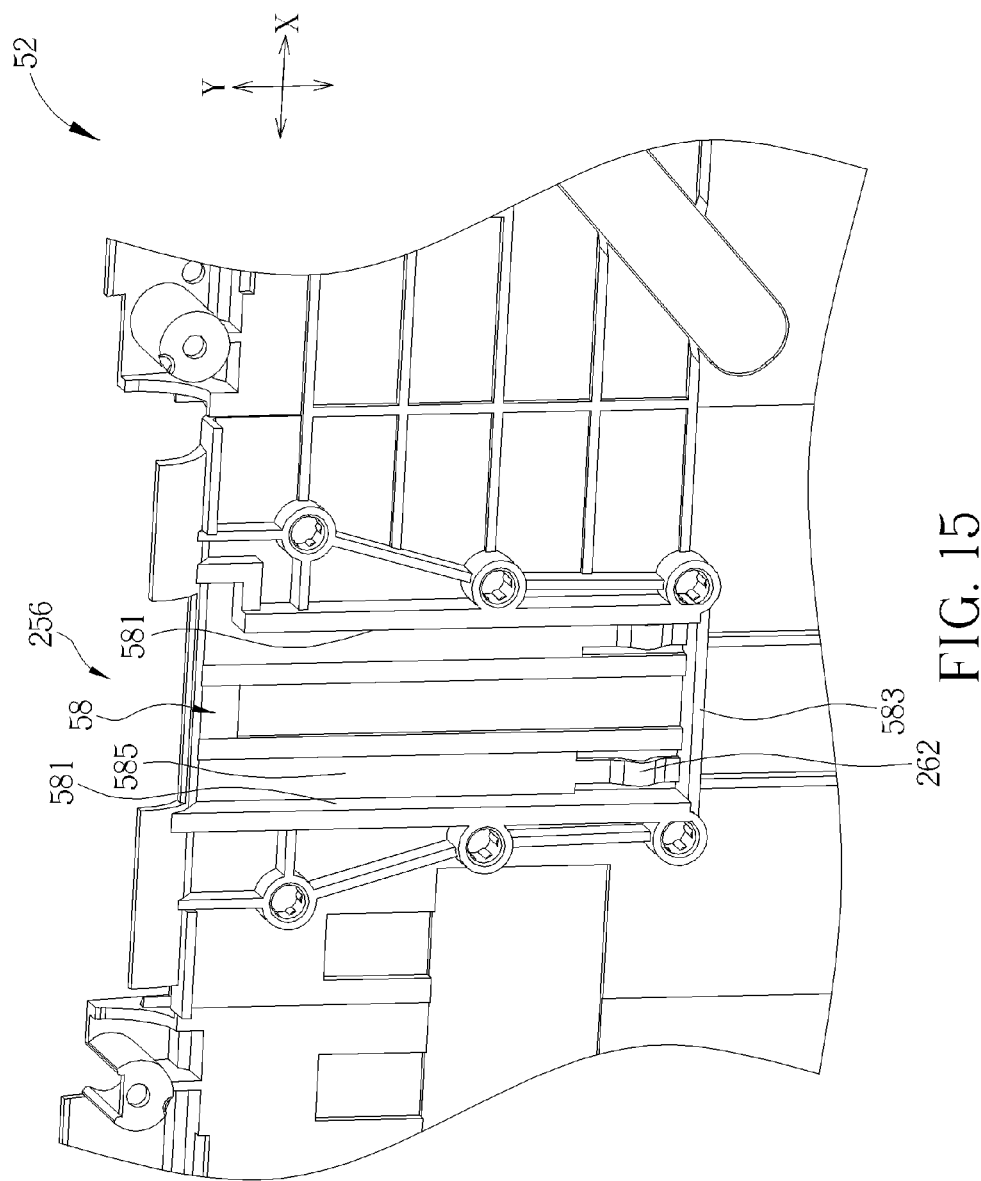
Figure 16:
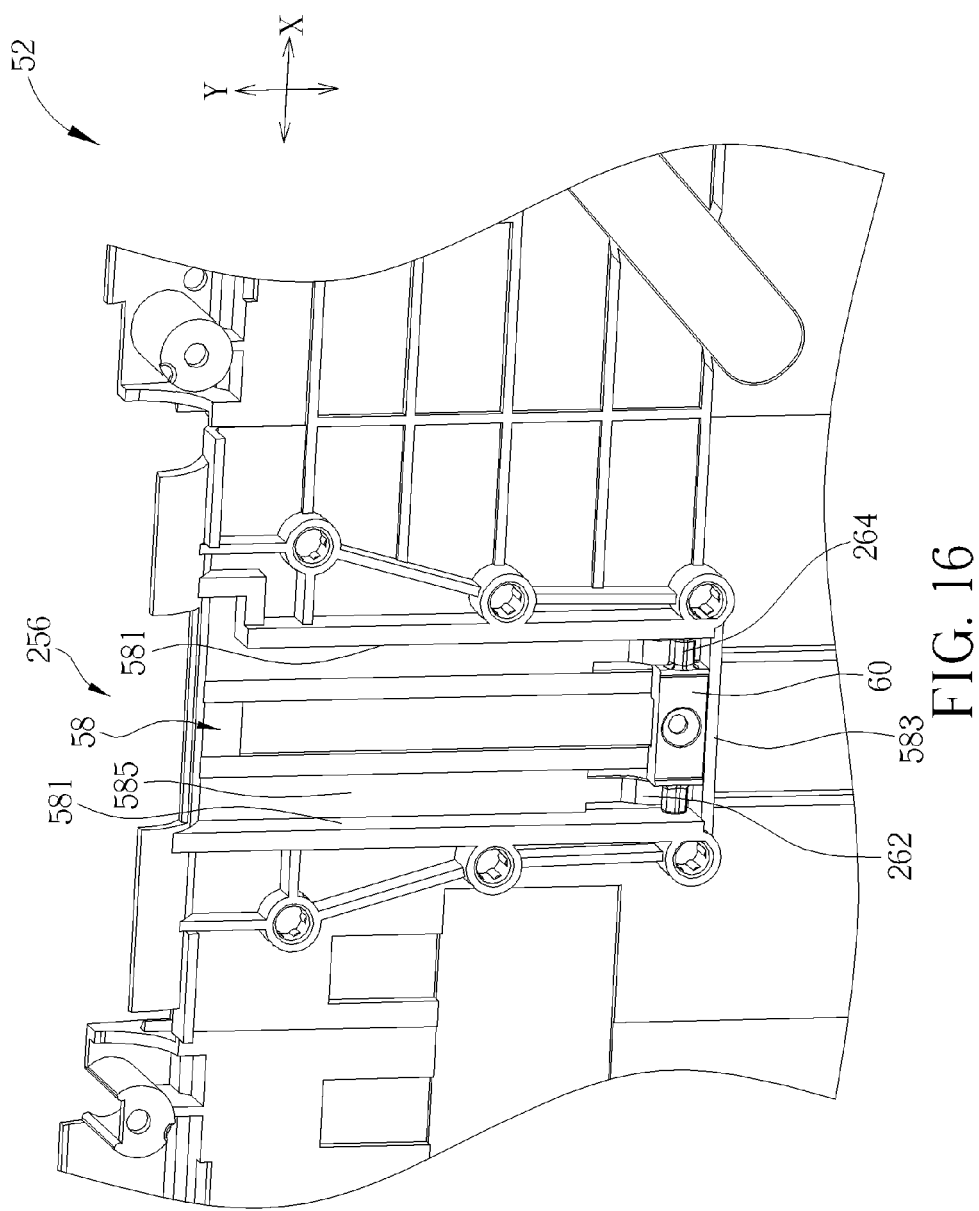
FIG. 16 is a sectional diagram of at least one positioning structure and at least one engaging structure according to the third embodiment of the present disclosure.
Figure 17:
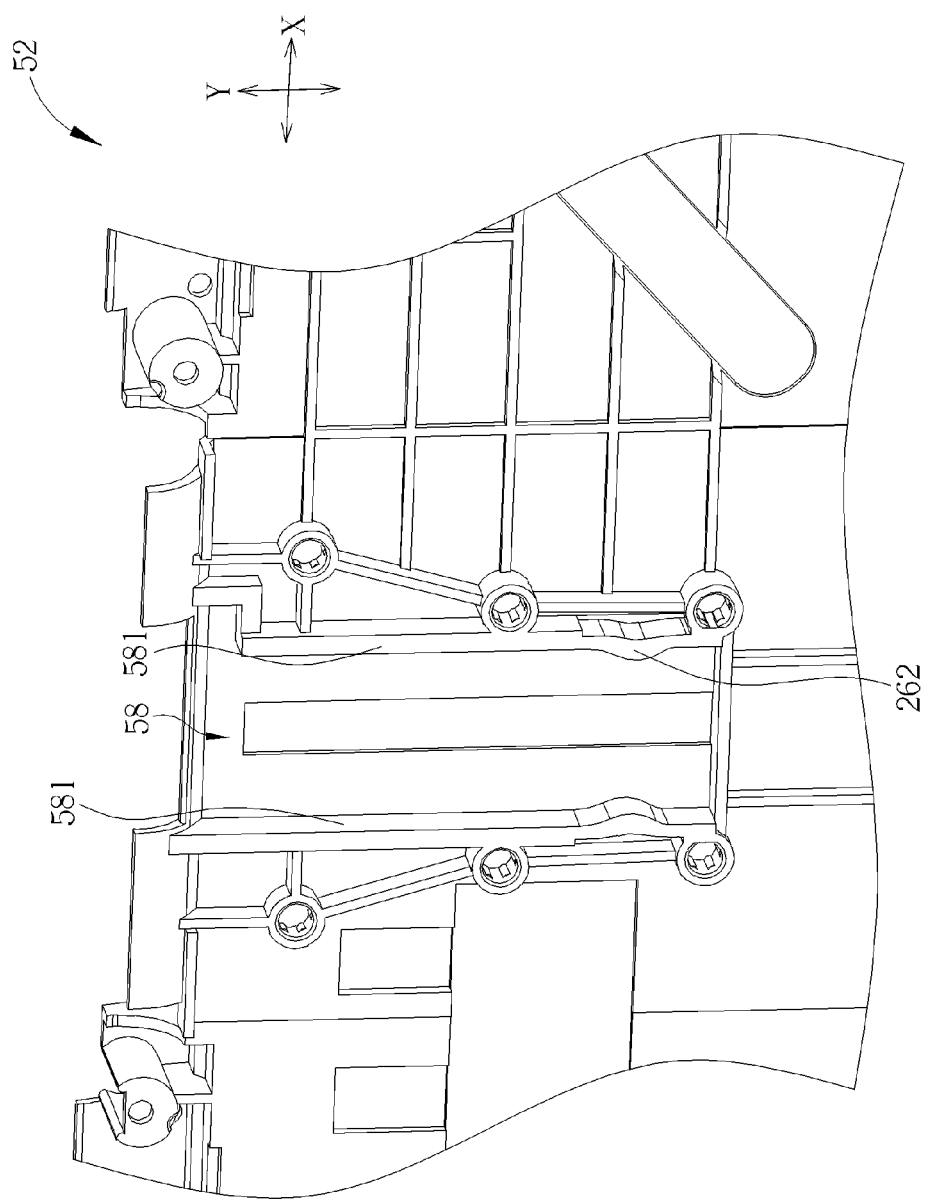
FIG. 17 is a diagram illustrating the positioning structure disposed on a lateral side of a track portion according to a fourth embodiment of the present disclosure.

Except for the fixing mechanism utilizing the spherical member and the recess structure, the fixing mechanism of the present disclosure can utilize other fixing member to fix the display module 54 relative to the host module 52. Please refer to FIG. 14 to FIG. 16. FIG. 14 and FIG. 15 are respectively partly diagrams of a fixing mechanism 256 according to a third embodiment of the present disclosure. FIG. 16 is a sectional diagram of at least one positioning structure 262 and at least one engaging structure 264 according to the third embodiment of the present disclosure. In this embodiment, the positioning structure 262 can be a resilient wave-shaped structure formed on a bottom side 583 of the track portion 58, and the engaging structure 264 can be a sliding rod structure which can be made of plastic or metal materials. When the display module 54 pivots and slides relative to the host module 52, the sliding portion 60 slides relative to the track portion 58 in the Y direction, and the two lateral sides 581 of the track portion 58 can constrain the sliding portion 60 to move in the X direction. When the sliding portion 60 slides relative to the track portion 58 to a position in FIG. 16 where the engaging structure 264 is about to engage with the positioning structure 262, the engaging structure 264, i.e. the sliding rod structure, presses the positioning structure 262, i.e. the resilient wave-shaped structure to pass through the positioning structure 262. In the meanwhile, it can provide a positioning feeling with multiple steps, so that the user feels the display module 54 is about to fix relative to the host module 52 in the engaging position. Finally, the sliding rod structure will engage with the resilient wave-shaped structure, so as to stably fix the display module 54 on the host module 52. In this embodiment, the sliding rod structure is engaged the resilient wave-shaped structure and a side wall 585 of the track portion 58 when the sliding portion 60 slides to the engaging position relative to the track portion 58. Similarly, the fixing mechanism 256 of the present disclosure can utilizes plural positioning mechanisms. In other words, a plurality of positioning structures 262 can be disposed on the track portion 58, i.e. a plurality of resilient wave-shaped structures, and the engaging structure 264 can selectively engage with one of the plurality of the positioning structures 262, so as to fix the display module 54 relative to the host module 52 indifferent positions. An amount and disposal position of the positioning structure 262 is not limited to those mentioned in this embodiment. Please refer to FIG. 17 for example. FIG. 17 is a diagram illustrating the positioning structure 262 disposed on the lateral side 581 of the track portion 58 according to a fourth embodiment of the present disclosure. Except for mechanism illustrated the positioning structure 262, i.e. the resilient wave-shaped structure, formed on the bottom side 583 of the track portion 58 in the aforesaid embodiment, the positioning structure 262 can be disposed on the lateral side 581 of the track portion 58. Furthermore, the plurality of the positioning structures 262 can be adopted as well. Alternatively, the sliding rod structure is engaged between the resilient wave-shaped structure and the side wall 585 of the track portion 58 when the sliding portion 60 slides to the engaging position relative to the track portion 58. The principle is similar to that mentioned above, and further description is omitted herein for simplicity.

As mentioned above, the present disclosure utilizes the positioning structure on the track portion and the engaging structure on the sliding portion to fix the display module on the host module. The structures, such as amounts and disposal positions, of the aforesaid positioning structure and the engaging structure are not limited to those mentioned in the embodiments. Furthermore, the structures in different embodiments can be alternately combined. For example, the recess structure is disposed on a side of the sliding portion, and the spherical member, the resilient member and the sleeve are disposed on another side of the sliding portion. Correspondingly, the spherical member, the resilient member and the sleeve are disposed on a side of the track portion, and the recess structure is disposed on another side of the track portion. Alternatively, the sliding rod structure and the resilient wave-shaped structure can cooperate with the recess structure, the spherical member, the resilient member, the sleeve as well. As for which one of the aforesaid designs is adopted, it depends on practical demands.

Compared to the prior art, the present disclosure utilizes the positioning structure of the track portion and the engaging structure of the sliding portion to fix the display module on the host module. Since the positioning structure and the engaging structure do not always contact during the whole sliding movement of the sliding portion and the track portion, the positioning structure engages with the engaging structure when the sliding portion slides relative to the track portion to the engaging position instead. Accordingly, it can reduce friction due to over contact between the sliding portion and a side wall of the track portion, so as to solve jammed situation and issue of the display module incapable of sliding smoothly relative to the host module. As a result, it can enhance convenience in operation. Furthermore, the fixing mechanism of the present disclosure can support the display module itself and the display module in use, so as to stably fix the display module on the host module and to stabilize performance of operation.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A fixing mechanism for fixing a slidable display module relative to a host module, the fixing mechanism comprising:
   a track portion disposed on the host module;
   a sliding portion connected to the display module and slidably installed inside the track portion, so that the display module is slidably installed on the host module;
   at least one positioning structure disposed on the track portion; and
   at least one engaging structure disposed on the sliding portion, the at least one engaging structure engaging with the at least one positioning structure when the sliding portion slides to an engaging position relative to the track portion, such that the sliding portion is fixed with the track portion, so as to fix the display module on the host module, and the at least one engaging structure not engaging with the at least one positioning structure when the sliding portion does not slide to the engaging position relative to the track portion, such that the sliding portion is slidable relative to the track portion, so as to adjust an angle between the display module and the host module.

2. The fixing mechanism of claim 1, wherein the at least one positioning structure is a recess structure disposed on a lateral side of the track portion, and the at least one engaging structure comprises:
   a spherical member for engaging with the recess structure; and
   a resilient member abutting against the spherical member for providing the spherical member with a resilient force, so as to drive the spherical member to engage with the recess structure when the sliding portion slides to the engaging position relative to the track portion.

3. The fixing mechanism of claim 2, wherein the at least one engaging structure further comprises a sleeve embedded in the sliding portion, and the spherical member and the resilient member are disposed inside the sleeve in a movable manner.

4. The fixing mechanism of claim 3, wherein a bore diameter of an opening on an end of the sleeve is substantially equal to or smaller than a diameter of the spherical member.

5. The fixing mechanism of claim 1, wherein the at least one engaging structure is a recess structure disposed on a lateral side of the sliding portion, and the at least one positioning structure comprises:
- a spherical member for engaging with the recess structure; and
- a resilient member abutting against the spherical member for providing the spherical member with a resilient force, so as to drive the spherical member to engage with the recess structure when the sliding portion slides to the engaging position relative to the track portion.

6. The fixing mechanism of claim 5, wherein the at least one positioning structure further comprises a sleeve embedded in the track portion, and the spherical member and the resilient member are disposed inside the sleeve in a movable manner.

7. The fixing mechanism of claim 6, wherein a bore diameter of an opening on an end of the sleeve is substantially equal to or smaller than a diameter of the spherical member.

8. The fixing mechanism of claim 1, wherein the at least one positioning structure is a resilient wave-shaped structure, and the at least one engaging structure is a sliding rod structure for engaging with the resilient wave-shaped structure when the sliding portion slides to the engaging position relative to the track portion.

9. The fixing mechanism of claim 8, wherein the sliding rod structure is engaged between the resilient wave-shaped structure and a side wall of the track portion when the sliding portion slides to the engaging position relative to the track portion.

10. The fixing mechanism of claim 8, wherein the resilient wave-shaped structure is disposed on a bottom side or a lateral side of the track portion.

11. A portable electronic device, comprising:
- a host module;
- a display module disposed on a side of the host module and slidable relative to the host module; and
- a fixing mechanism connected to the host module and the display module for fixing the display module on the host module, the fixing mechanism comprising:
  - a track portion disposed on the host module;
  - a sliding portion connected to the display module and slidably installed inside the track portion, so that the display module is slidably installed on the host module;
  - at least one positioning structure disposed on the track portion; and
  - at least one engaging structure disposed on the sliding portion, the at least one engaging structure engaging with the at least one positioning structure when the sliding portion slides to an engaging position relative to the track portion, such that the sliding portion is fixed with the track portion, so as to fix the display module on the host module, and the at least one engaging structure not engaging with the at least one positioning structure when the sliding portion does not slide to the engaging position relative to the track portion, such that the sliding portion is slidable relative to the track portion, so as to adjust an angle between the display module and the host module.

12. The portable electronic device of claim 11, wherein the at least one positioning structure is a recess structure disposed on a lateral side of the track portion, and the at least one engaging structure comprises:
- a spherical member for engaging with the recess structure; and
- a resilient member abutting against the spherical member for providing the spherical member with a resilient force, so as to drive the spherical member to engage with the recess structure when the sliding portion slides to the engaging position relative to the track portion.

13. The portable electronic device of claim 12, wherein the at least one engaging structure further comprises a sleeve embedded in the sliding portion, and the spherical member and the resilient member are disposed inside the sleeve in a movable manner.

14. The portable electronic device of claim 13, wherein a bore diameter of an opening on an end of the sleeve is substantially equal to or smaller than a diameter of the spherical member.

15. The portable electronic device of claim 11, wherein the at least one engaging structure is a recess structure disposed on a lateral side of the sliding portion, and the at least one positioning structure comprises:
- a spherical member for engaging with the recess structure; and
- a resilient member abutting against the spherical member for providing the spherical member with a resilient force, so as to drive the spherical member to engage with the recess structure when the sliding portion slides to the engaging position relative to the track portion.

16. The portable electronic device of claim 15, wherein the at least one positioning structure further comprises a sleeve embedded in the track portion, and the spherical member and the resilient member are disposed inside the sleeve in a movable manner.

17. The portable electronic device of claim 16, wherein a bore diameter of an opening on an end of the sleeve is substantially equal to or smaller than a diameter of the spherical member.

18. The portable electronic device of claim 11, wherein the at least one positioning structure is a resilient wave-shaped structure, and the at least one engaging structure is a sliding rod structure for engaging with the resilient wave-shaped structure when the sliding portion slides to the engaging position relative to the track portion.

19. The portable electronic device of claim 18, wherein the sliding rod structure is engaged between the resilient wave-shaped structure and a side wall of the track portion when the sliding portion slides to the engaging position relative to the track portion.

20. The portable electronic device of claim 18, wherein the resilient wave-shaped structure is disposed on a bottom side or a lateral side of the track portion.

* * * * *